Jan. 10, 1939.                I. MILLER                2,143,788
                          PARTITIONING DEVICE
                          Filed June 22, 1937
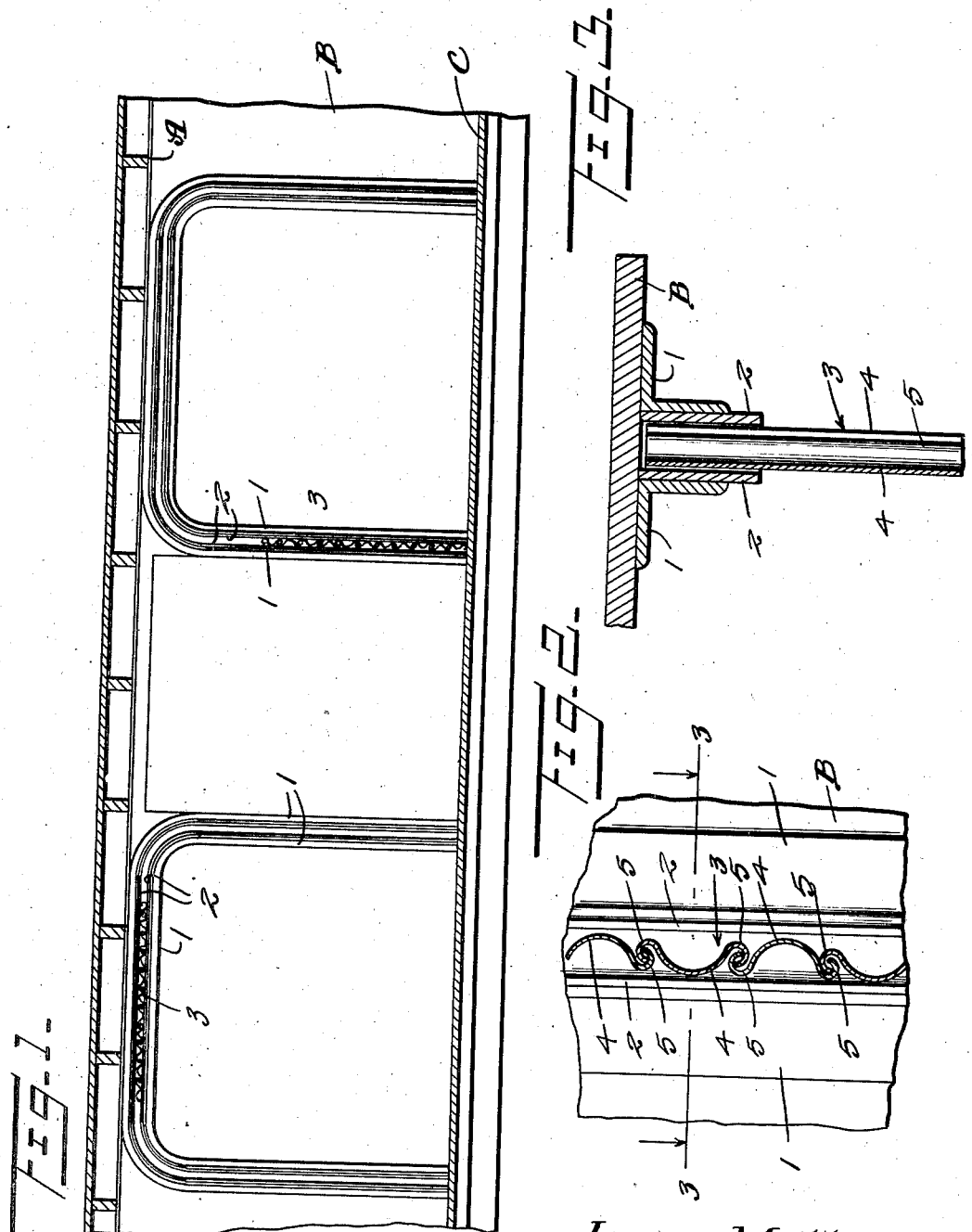
Iver Miller
INVENTOR Patented Jan. 10, 1939

2,143,788

UNITED STATES PATENT OFFICE 2,143,788

PARTITIONING DEVICE

Iver Miller, Green Bay, Wis., assignor of one-half to James H. McGinnis, Green Bay, Wis.

Application June 22, 1937, Serial No. 149,743

1 Claim. (Cl. 105—376)

This invention relates to partitions, and its general object is to provide a partitioning device that is primarily designed for use with railway cars, hauling trucks and the like, to divide the bodies thereof into separate compartments to keep different kinds of goods apart, as well as to make it possible to carry one or a number of individual shipments of less than a car or truck load lot, in a single car or truck, without damage to the goods.

An important object is to provide a partitioning device that includes a movable partition to vary the size of the compartments in accordance with the size of the shipments, and the partition can be moved in an easy and expeditious manner for that purpose, or to a position out of use, so that a full car load lot can be carried if desired.

Another object is to provide a partitioning device that includes a flexible partition or wall mounted for movement in trackways, and the flexibility of the partition not only allows it to be readily moved to its various positions, but permits it to give under undue pressure, thereby preventing damage to the goods.

A further object is to provide a partitioning device that can be readily installed in car and truck bodies now in general use, without change to the present structure thereof, and the device is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a longitudinal vertical sectional view taken through a box car, with two of my partitioning devices installed therein, one upon opposite sides of the door opening.

Figure 2 is an enlarged fragmentary sectional view taken through the flexible and movable partition or wall.

Figure 3 is a sectional view taken approximately on line 3—3 of Figure 2, looking in the direction of the arrows.

Referring to the drawing in detail, it will be noted that I have illustrated my partitioning devices as being installed within the body of a box car, but I want it understood that they can be used with any type of car, truck or the like, and the body as shown includes a ceiling A, a side wall B, and a floor C.

My partitioning device includes a pair of trackways of inverted U-form, to be fixed to the side walls B of the body in aligned position with respect to each other, and each trackway is made up of a pair of angle members 1 having one of their angle portions fixed to the side walls of the car and their other angle portions disposed in spaced parallel relation with respect to each other, as clearly shown in Figure 3. These angle members extend for the entire length of the trackways and are likewise fixed to the floor C as well as the ceiling A, it being obvious that the means for securing the trackways to the ceiling, side walls and floor may be any suitable means, such as bolt and nut connections. Cooperating with the angle members 1 are bearing strips 2 which are fixed to the confronting faces of the parallel angle portions and follow the shape thereof, as clearly shown in Figure 1. The bearing strips extend outwardly beyond the parallel portions of the angle members, as best shown in Figure 3.

Mounted for slidable movement in the bearing strips of the trackways, to be positioned in either of the vertical portions thereof or the horizontal portion as shown in Figure 1, and bridging the same, is the partition of my partitioning device and which is broadly indicated by the numeral 3. The partition 3 includes a plurality of relatively narrow elongated resilient metallic sections 4, each of which is curved transversely throughout the length thereof and have rolled tongues 5 formed on the longitudinal edges thereof. The sections are connected together by the tongues of companion sections being disposed in interlocked association with each other, and the sections are so arranged to provide a partition or wall of corrugated formation, which not only adds materially to the strength theerof, but such arrangement cooperates with the flexibility brought about by the connection of the interlocking tongues, to permit the wall to give under undue pressure, thereby preventing damage to the goods.

It will be obvious from Figure 1, that the partition 3 can be moved to any of the positions shown and such is accomplished merely by sliding the partitions in the trackways. Any suitable means may be employed for retaining the partitions secured in the upper or horizontal positions, and of course the partitions are retained in their vertical positions by gravity. However, it will be obvious that a certain amount of friction is present between the partitions and the trackways, and such will tend to retain the partitions in their respective positions.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a partitioning device for use in the body of a railway car, highway truck or the like, and including a pair of companion trackways of inverted U-form to provide vertical portions and horizontal portions, said trackways being arranged against the side walls of the body and symmetrically disposed about a vertical plane at right angles to the longitudinal center line of the body for cooperation of the trackways with each other to receive the ends of a flexible partition for the disposal thereof in bridging relation to the body to be guided for movement in the trackways, and said trackways each comprising a pair of parallel spaced angle members each having one of their angle portions fixed to the side walls and the other angle portions extending into the body in face to face relation, bearing strips for the ends of the partition and secured to the confronting faces of the face to face portions, said vertical portions being of a length to extend from the floor of the body to dispose said horizontal portions against the ceiling of the body, and the partition being of a length to be wholly arranged in the vertical portions to divide the body into separate compartments, or to be wholly arranged in the horizontal portions for disposal of the partitions out of use.

IVER MILLER.